United States Patent [19]

Kanno et al.

[11] 3,824,346

[45] July 16, 1974

[54] FM STEREO DEMODULATOR

[75] Inventors: Masashi Kanno, Kadoma; Sukeichi Miki, Ikoma; Tsuneo Takezaki, Neyagawa, all of Japan

[73] Assignee: Matsushita Electric Industrial Co., Ltd., Kadoma, Osaka, Japan

[22] Filed: Apr. 17, 1972

[21] Appl. No.: 244,559

[30] Foreign Application Priority Data

April 21, 1971 Japan .......................... 46-25851

[52] U.S. Cl. .............................. 179/15 BT, 325/329

[51] Int. Cl. ............................................. H04h 5/00

[58] Field of Search .......... 179/15 BT; 329/50, 135, 329/145, 101, 146, 112; 325/329

[56] References Cited

UNITED STATES PATENTS

| | | | |
|---|---|---|---|
| 3,114,004 | 12/1963 | Schroeder | 179/15 BT |
| 3,290,443 | 12/1966 | Mergner | 179/15 BT |
| 3,375,453 | 3/1968 | Adler | 329/50 |
| 3,573,382 | 4/1971 | Fiet | 179/15 BT |
| 3,584,154 | 6/1971 | McShan | 179/15 BT |
| 3,643,165 | 2/1972 | Kuribayashi | 325/329 |
| 3,679,832 | 7/1972 | Halpern | 179/15 BT |
| 3,721,766 | 3/1973 | Hilbert | 179/15 BT |

OTHER PUBLICATIONS

FM Stereo: Time Division approved by Eilers Audio Magazine, August 1961.

*Primary Examiner*—Kathleen H. Claffy
*Assistant Examiner*—Thomas D'Amico
*Attorney, Agent, or Firm*—Wenderoth, Lind & Ponack

[57] ABSTRACT

An FM stereo receiver having receiving means; demodulating signal generating means which produces a first demodulating signal having a fundamental frequency of 19 KHz and a phase the same as that of a pilot signal and which produces a second demodulating signal having a fundamental frequency of 19KHz and a phase different by $\pi/2$ radian from that of the pilot signal; and demodulation means which receives the first and the second demodulating signals and a frequency discriminated signal from the receiving means and which reproduces as discrete signals the L and R audio signals.

1 Claim, 7 Drawing Figures

FIG. 3(C')

FM STEREO DEMODULATOR

This invention relates to an FM stereo receiver for receiving an FM stereo broadcasting wave, and more particularly relates to an improved arrangement for demodulating two stereophonically related audio signals from a composite FM signal by using two demodulating signals each having a fundamental frequency of 19KHz.

An FM stereo broadcasting wave at the present time comprises a carrier frequency-modulated signal corresponding to a composite FM signal as expressed by:

$$(L + R) + (L - R)\sin 2\pi f_s t + P\sin \pi f_s t \quad (1)$$

where $L$ is a left audio signal, $R$ is a right audio signal, $f_s$ is a frequency of the subcarrier signal (38KHz) which is suppressed at a transmitter, $P$ is the constant, and $t$ is time.

In the FM stereo receiver for receiving the above FM stereo broadcasting wave, said composite FM signal is reproduced at the output terminal of a frequency discriminator in the form of a frequency discriminated signal by well-known receiving means such as an FM front-end and an IF amplifier. Said composite FM signal is supplied to a stereo decoder, and then L and R signals are reproduced and are respectively supplied to loud speakers after adequate amplifying.

In the stereo decoder, a demodulating signal is required to be reproduced from said FM composite signal and then L and R signals are reproduced thereby. In the conventional decoder, the demodulating signal, which is reproduced from the 19KHz pilot signal, for example, by use of a frequency doubler has the same frequency as that of a subcarrier signal, i.e., 38KHz.

In the conventional manner of reproducing a 38KHz demodulating signal, at least two tank circuits are needed. One is for a 19KHz tuned amplifier and the other is for a frequency doubler. Therefore, there are many difficulties that it is difficult to adjust these tank circuits; that the phase of the reproduced demodulating signal easily deviates from that of the subcarrier signal which is suppressed at the transmitter; and that the demodulating signal is liable to contain a frequency component of 19KHz, because the frequency component of 19KHz cannot be eliminated completely in the tank circuit of the frequency doubler.

Consequently, these troubles cause low productivity in manufacturing the FM stereo receivers, deterioration of the channel separation, and the occurrence of undesired signals such as beat frequency components produced by the composite signal and the above mentioned frequency component of 19KHz in the demodulating signal.

Accordingly, it is a primary object of the present invention to use two demodulating signals which have the same fundamental frequency of 19KHz and phases different by $\pi/2$ radians from each other.

It is another object of the present invention to provide an FM stereo receiver having a simple circuit arrangement.

It is still another object of the present invention to provide an FM stereo receiver having a circuit arrangement in which L and R audio signals are reproduced with high fidelity and without any undesired signals.

Another particular object of the present invention is to provide an FM stereo receiver which provides a stereo recognition signal which can be used for indicating whether a stereo FM signal is received or not, for stereo-mono audio switching, and/or for muting the reproduced audio signals in a monaural broadcasting wave receiving state.

Further objects and features of the present invention will be apparent from the following description taken together with the accompanying drawings, wherein.

The FM stereo receiver of the present invention is for receiving an FM broadcasting wave which is frequency-modulated in accordance with a composite FM signal including at least a signal expressed by $(L + R) + (L - R)\sin 2\pi f_s t + P\sin \pi f_s t$, where $L$ and $R$ represent a left audio signal and a right audio signal, respectively, $f_s$ is a frequency of 38KHz, $P$ is a constant, $t$ is time, and $P\sin \pi f_s t$ represents a pilot signal of 19KHz.

The FM stereo receiver of the present invention comprises: receiving means including a frequency discriminator which produces a frequency discriminated signal corresponding to said composite FM signal; demodulating signal generating means which is coupled to the output terminal of said receiving means and is responsive to said pilot signal included in said composite FM signal so as to produce a frist demodulating signal having a fundamental frequency of 19KHz and a phase the same as that of said pilot signal and to produce a second demodulating signal having a fundamental frequency of 19KHz and a phase different by $\pi/2$ radians from that of said pilot signal; and demodulation means which is coupled to said receiving means and receives said first and said second demodulating signals from said demodulating signal generating means so as to reproduce as discrete signals said L and R audio signals.

One embodiment of the present invention will be described in detail hereinafter with reference to FIG. 1.

Figure 1:
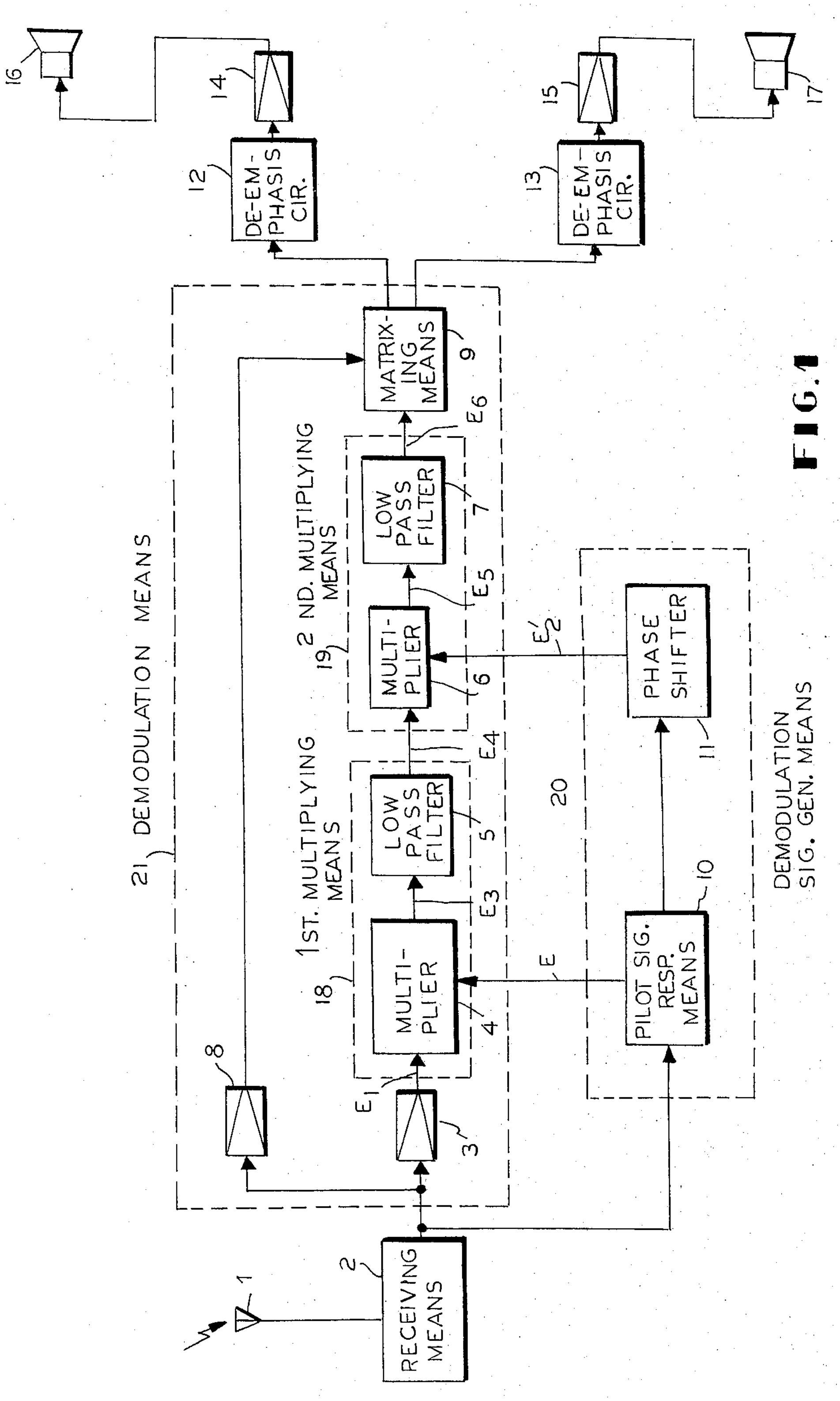
FIG. 1 is a schematic circuit diagram, in block form, of an embodiment of an FM stereo receiver in accordance with the present invention.

Referring to FIG. 1, reference numeral 1 designates an antenna which receives an FM broadcasting wave which is frequency-modulated in accordance with a composite FM signal including at least a signal expressed by $(L + R) + (L - R)\sin 2\pi f_s t + P\sin \pi f_s t$, where $L$ and $R$ represent a left audio signal, and a right audio signal, respectively, $f_s$ is a frequency of 38KHz, $P$ is a constant, $t$ is time, and $P\sin \pi f_s t$ represents a pilot signal of 19KHz. Reference numeral 2 designates a receiving means which includes at least a frequency discriminator, and can further include an FM front-end and an IF amplifier, etc. Said receiving means produces a frequency discriminated signal corresponding to said composite FM signal. Reference numeral 20 designates a demodulating signal generating means which receives said frequency discriminated signal and produces a first demodulating signal having a fundamental frequency of 19KHz and a phase the same as that of said pilot signal and also produces a second demodulating signal having a fundamental frequency of 19KHz and a phase different by $\pi/2$ radians from that of said pilot signal. In FIG. 1, said demodulating signal generating means 20 comprises a pilot signal responsive means 10 and a phase shifter 11. It should be noted that as a practical matter said demodulating signal generating means 20 need not necessarily comprise such pilot signal responsive means 10 and phase shifter 11. Said demodulating signal generating means 20 can be composed of any arrangement which receives said frequency discriminated signal and produces said first and second demodulating signals. Said pilot signal responsive means 10 amplifies selectively the pilot signal included in said frequency discriminated signal and produces said first demodulating signal. One example of said pilot signal responsive means 10 is a tuned amplifier. Another example is a bandpass filter. Said phase shifter 11 shifts the phase of said first demodulating signal by $\pi/2$ radians so as to produce said second demodulating signal. Said phase shifter 11 can be composed of a very simple RC network which is well known, but can also be composed of any known phase shifter.

Reference numeral 21 designates a demodulation means which is coupled to said receiving means 2 and receives said first and said second demodulating signals from said demodulating signal generating means 20 so as to reproduce as discrete signals the L and R audio signals. Reference numeral 3 designates a pre-amplifier which amplifies said frequency discriminated signal. However, this preamplifier 3 is not always necessary when said frequency discriminated signal has a satisfactory level. Reference numeral 18 designates a first multiplying means which receives said frequency discriminated signal and one of said first and said second demodulating signals. FIG. 1 shows the case when said first demodulating signal is received by said first multiplying means 18. Said first multiplying means multiplies said frequency discriminated signal and said first demodulating signal so as to produce a first multiplied signal. In FIG. 1, said first multiplying means 18 comprises a multiplier 4 and a low pass filter 5 having a cut-off frequency of 34KHz. This low pass filter 5 is not always necessary when said multiplier 4 has good multiplication characteristics. One example of said multiplier 4 is a ring demodulator. Another example is a doubly balanced demodulator. Reference numeral 19 designates a second multiplying means which receives said first multiplied signal and the other of said first and said second demodulating signals. FIG. 1 shows an arrangement in which said second demodulating signal is received by said second multiplying means 19. Said second multiplying means 19 multiplies said first multiplied signal and said second demodulating signal so as to produce a second multiplied signal. In FIG. 1, said second multiplying means 19 comprises a multiplier 6 and a low pass filter 7 having a cut-off frequency of 15KHz. This low pass filter 7 is not always necessary when said multiplier 6 has good multiplication characteristics. Said multiplier 6 is similar to said multiplier 4. Reference numeral 8 designates another pre-amplifier which amplifies said frequency discriminated signal. However, this pre-amplifier 8 is not always necessary when said frequency discriminated signal has a satisfactory level. Reference numeral 9 designates matrixing means which receives said frequency discriminated signal and said second multiplied signal so as to reproduce one output signal corresponding to an audio signal L through one output terminal thereof and another output signal corresponding to an audio signal R through the other output terminal thereof. Reference numerals 12 and 13 designate de-emphasis circuits which receives said two output signals, respectively. Reference numerals 14 and 15 designate audio amplifiers. Reference numerals 16 and 17 designate loud speakers. Thus, the audio signals L and R are reproduced from the loud speakers 16 and 17.

The operation of the demodulation means 21 in FIG. 1 will be explained in detail hereinafter.

Referring to FIG. 1 again, the signal supplied to said first multiplying means 18 includes a signal expressed by $(L+R) + (L-R)\sin 2\pi f_s t + P\sin \pi f_s t$. However, in considering demodulation through the first and the second multiplying means 18 and 19 and the matrixing means 9, it is sufficient to consider the component $(L-R)\sin 2\pi f_s t$. Let this component be called $E_1$. Thus, $$E_1 = (L-R)\sin 2\pi f_s t \tag{2}$$

The two demodulating signals can be rectangular waves or sinusoidal waves. For convenience sake, the principle of the operation of the demodulation means will be described hereinafter on the assumption that the two demodulating signals are sinusoidal waves. However, it is apparent that the principle is essentially the same for rectangular waves also. Furthermore, the factor of each signal expression which is not necessary to be used is mathematically omitted hereinafter. The first demodulating signal ($E_2$) can be expressed by:

$$E_2 = \sin \pi f_s t \tag{3}$$

The above signals $E_1$ and $E_2$ are multiplied by the multiplier 4 and the resultant output signal ($E_3$) is obviously represented by the following expression:

$$E_3 = (L-R)\ (\cos \pi f_s t - \cos 3\pi f_s t) \tag{4}$$

The $(L-R)$ signal has frequency components of less than 15KHz and so, signal $E_3$ comprises one frequency band from 4KHz to 34KHz and a second freqeuncy band from 42KHz to 72KHz. When signal $E_3$ is applied to the low pass filter 5 which has a cut-off frequency of 34KHz, the resultant output signal $E_4$ is developed and represented by the following expression:

$$E_4 = (L-R)\cos \pi f_s t \tag{5}$$

Similarly, the second demodulating signal ($E_2'$) is represented by the following expression:

$$E_2' = \cos \pi f_s t \tag{6}$$

The multiplier 6 multiplies the above signals $E_4$ and $E_2'$. Therefore, the output signal ($E_5$) is developed at the multiplier 6 and represented by the following expression:

$$E_5 = (L-R)\ (1 - \cos 2\pi f_s t) \tag{7}$$

The signal $E_5$ is further supplied to the low pass filter 7 which has a cut-off frequency of 15KHz. Then the output signal ($E_6$) of the low pass filter 7 is developed and is represented by the following expression:

$$E_6 = L - R \quad (8)$$

The signal $E_6$ is the second multiplied signal, i.e., a difference signal, which is demodulated from the composite FM signal, and is supplied to one input terminal of the matrixing means 9.

Accordingly, it can be easily understood that the signals L and R are developed as discrete signals at the two output terminals of the matrixing means which receives said signal $E_6$ and said frequency discriminated signal through the pre-amplifier 8.

As above mentioned, according to this invention, the demodulating signals of 19KHz are used in demodulation without the conventional demodulating signal of 38KHz. Therefore it is not necessary to use a frequency doubler or to use many tank circuits, that is, many coils. Therefore, the circuitry is simple, and also inexpensive and suitable for formation into an integrated circuit. Further the undesired signals such as the best frequency components are not produced. Furthermore, the L and R signals are reproduced with good channel separation because no phase error is likely to be produced between the pilot signal and the demodulating signals.

Another embodiment of the present invention will be described hereinafter with reference to FIG. 2, wherein the same means as used in FIG. 1 are designated by the same reference numerals.

Figure 2:
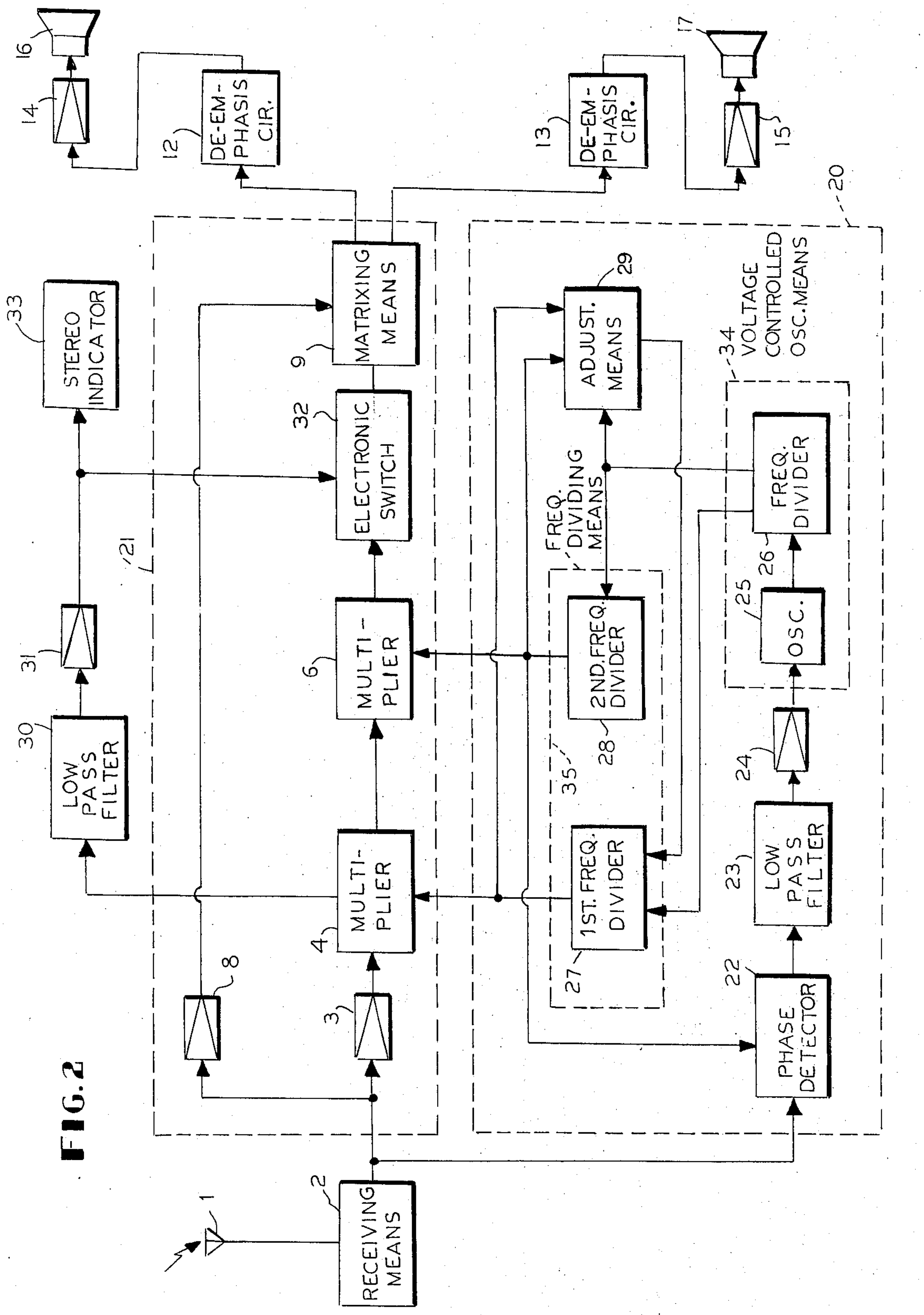
FIG. 2 is a schematic circuit diagram, in block form, of another embodiment of an FM stereo receiver in accordance with the present invention.
Figure 3A:
FIGS. 3A–3D are graphs of wave forms for explaining the operation of the adjusting means in FIG. 2.
Figure 3B:
Figure 3C:
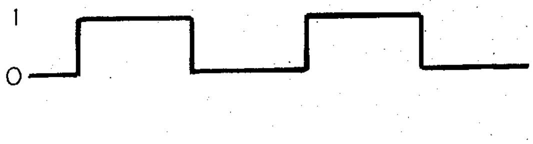
Figure 3C:
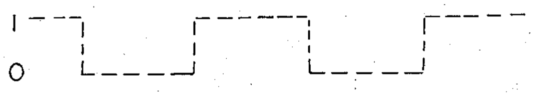
Figure 3D:
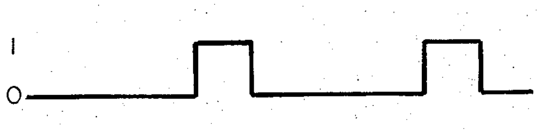

Referring to FIG. 2, reference numeral 22 designates a phase detector which receives said frequency discriminated signal. Reference numeral 23 designates a low pass filter coupled to said phase detector 22. Reference numeral 24 designates d.c. amplifier which is coupled to said low pass filter 23. This d.c. amplifier 24 is not always necessary. Reference numeral 34 designates a voltage controlled oscillating means which is coupled to said d.c. amplifier 24 and has a free running frequency of nearly 38KHz. In FIG. 2, said voltage controlled oscillating means 34 comprises an oscillator 25, which has a free running frequency of nearly 76KHz and a frequency divider 26 which divides said free running frequency so as to produce two output signals each having a frequency of nearly 38KHz, the polarity of one of said output signals being opposite to that of the other. It is possible for said oscillator 25 to have a free running frequency higher than 38KHz, such as 152KHz and 304KHz. In such cases, said frequency divider 26 should be ½ frequency divider or an ⅛ frequency divider, respectively.

Generally, the oscillator 25 has a free running frequency of nearly $38xn$ KHz ($n$=1, 2, 3, 4, . . .). In such case, the frequency divider 26 is a $1/n$ frequency divider ($n$=1, 2, 3, 4, . . .). Reference numeral 35 designates a frequency dividing means which is coupled to said voltage controlled oscillating means 34 and produces said first and said second demodulating signals at a first and a second output terminal thereof, respectively, said second output terminal being connected to said phase detector 22. In FIG. 2, said frequency dividing means 35 comprises a first frequency divider 27 and a second frequency divider 28. Said first frequency divider 27 receives one output signal from said frequency divider 26 and produces the first demodulating signal. Said second frequency divider 28 receives the other output signal from said frequency divider 26 and produces the second demodulating signal. Reference numeral 29 designates an adjusting means which has input terminals coupled to the output of said voltage controlled oscillating means 34 and said first and said second output terminals of said frequency dividing means 35, and has an output terminal connected to said first frequency divider 27. Said phase detector 22 compares the phase of said frequency discriminated signal with that of the signal from said second output terminal of said frequency dividing means 35 so as to produce an error signal. Said low pass filter 23 receives said error signal and produces a control signal which is supplied to said voltage controlled oscillating means 34 so as to lock said free running frequency of nearly 38KHz at 38KHz. Said adjusting means 29 receives the signals from said first and said second output terminals of said frequency dividing means 35 and the signal from said voltage controlled oscillating means 34 and supplies a correction to said first frequency divider 27 so as to adjust the phase relation between said first and said second demodulating signals.

The operation of the demodulating signal generating means in FIG. 2 will be explained in detail hereinafter.

The phase detector 22 carries ou the multiplication of the frequency discriminated signal and the output signal from said second output terminal of said frequency dividing means 35. The low pass filter 23 has a cut-off frequency of a few hundred Hz. Therefore, said resultant error signal is limited to a frequency below said cut-off frequency. In other words, said error signal at the output of low pass filter 23 contains only the product component between the output signal from said second output terminal of said frequency dividing means 35 and the pilot signal included in said frequency discriminated signal. Said error signal is amplified by d.c. amplifier 24, and supplied to said voltage controlled oscillating means 34. The loop comprising said voltage controlled oscillating means 34, frequency dividing means 35, said phase detector 22, low pass filter (23) and d.c. amplifier 24 is a so-called phase locked loop(PLL).

During the locking state of said loop, the frequency of said oscillator 25 is equal to 76KHz. The frequency of said frequency divider 26 is equal to 38KHz and the frequencies of said first frequency divider 27 and said second frequency divider 28 are equal to 19KHz. Since the pilot signal is expressed by $\sin \pi f_s t$, the output signal of said second frequency divider 28 can be expressed by $\cos \pi f_s t$, while the output signal of said first frequency divider 27 can be expressed by $\sin \pi f_s t$.

One example of said frequency divider 26 and said first and said second freqeuncy dividers is a flip-flop.

One example of said adjusting means 29 is an AND gate.

The operation of the adjusting means 29, when the adjusting means is an AND gate, will be explained hereinafter with reference to FIG. 3.

The AND gate has three input terminals. The first input terminal receives the output signal (A) from the frequency divider 26. The second input terminal receives the output signal (B) from the frequency divider 28. The third input terminal receives the output signal (C) or (C′) from the frequency divider 27. The relation of the three input signals and the output signal of said AND gate is illustrated in FIG. 3.

When the relation among the three input signals of AND gate is (A) − (B) − (C), no signal appears at the output terminal of the AND gate. On the other hand, a trigger pulse (D) appears at the output terminal of the AND gate when said relation is (A) − (B) − (C′) in FIG. 3. Said trigger pulse is supplied to said frequency divider 26 and reverses the phase of the frequency divider 26. Accordingly, the relation (A) − (B) − (C) of FIG. 3 is maintained and fixed. Thus, the two demodulating signals are produced as the output signals of the first and the second frequency dividers 27 and 28.

Referring to FIG. 2 again, reference numeral 3 designates a pre-amplifier which receives said frequency discriminated signal. Reference numeral 4 designates a first multiplier which is coupled to said pre-amplifier 3 and receives said first demodulating signal. Reference numeral 6 designates a second multiplier which is coupled to said first multiplier 4 and receives said second demodulating signal. Reference numeral 32 designates an electronic switch which is coupled to said multiplier 6. Reference numeral 9 designates a matrixing means which is coupled to said electronic switch 32 and receives said frequency discriminated signal through another pre-amplifier 8. Reference numeral 30 designates a low pass filter which is coupled to said first multiplier 4. Reference numeral 31 designates a d.c. amplifier which is coupled to said low pass filter 30. Reference numeral 33 designates a stereo indicator which is coupled to said d.c. amplifier. Said electronic switch 32 is also coupled to said d.c. amplifier 31.

It is quite clear from the aforesaid description taken together with FIG. 1 that the output signal of said second multiplier 6 includes a signal corresponding to said signal $E_6=(L-R)$.

If it is assumed that the output signal of the second multiplier 6 includes the signal $(L-R)$ when the fixed relation such as (A) − (B) − (C) as above described is maintained, the output signal of the second multiplier 6 should include the signal $-(L-R)$ when the relation such as (A) − (B) − (C′) as above described is present. Therefore, when the relation such as (A) − (B) − (C′) exists, signals $L$ and $R$ appear at the output terminals for the signals $R$ and $L$, respectively. This is undesirable. Said adjusting means such as the AND gate solves this problem because it changes immediately the undesirable relation such as (A) − (B) − (C′) to the desirable relation such as (A) − (B) − (C) and maintains the desirable relation.

Now, it should be noted that the output signal of the multiplier 4 contains a product signal of the pilot signal included in the composite FM signal and the frequency component of 19KHz included in the first demodulating signal, that is, $\sin\pi f_s t \times \sin\pi f_s t$. The low pass filter 30 acts to obtain the d.c. component of said product signal. Said d.c. component is amplified by the d.c. amplifier 31. The electronic switch 32 acts under the control of the output signal of said d.c. amplifier 31 as follows: The electronic switch 32 is closed to connect the second multiplier 6 to the matrixing means 9 and to set the receiver in the stereo mode if said output signal of the d.c. amplifier 31 is at a sufficient level. On the other hand, said switch 32 is opened and sets the receiver in the monaural mode, or mono-mode, if said output signal of the d.c. amplifier is not at a sufficient level.

The output signal of the d.c. amplifier 31 is also supplied to the stereo indicator 33. The output signal of the d.c. amplifier 31 thus indicates the presence of the stereo FM broadcasting wave. Therefore, in other words, the output signal is a stereo recognition signal. It is apparent to those skilled in the art that said stereo recognition signal can be used for other purposes such as mono-muting which means the muting of reproduced audio signals in the case of monaural broadcasting.

As is apparent from the above description, one feature according to the embodiment as shown in FIG. 2 is the use of two demodulating signals each having a fundamental frequency of 19KHz. Another feature is the use of the phase lock technique for obtaining the two demodulating signals.

Still another feature is the use of the first multiplier in common for the stereo signal demodulation and for producing the stereo recognition signal.

What we claim is:

1. An FM stereo receiver for receiving an FM broadcasting wave which is frequency-modulated in accordance with a composite FM signal including at least a signal expressed by $(L + R) + (L - R) \sin 2\pi f_s t + P\sin\pi f_s t$, where $L$ and $R$ represent a left audio signal and a right audio signal, respectively, $f_s$ is a frequency of 38 KHz, $P$ is a constant, $t$ is time, and $P\sin\pi f_s t$ represents a pilot signal of 19 KHz, said receiver comprising;

receiving means including a frequency discriminator which produces a frequency discriminated signal corresponding to said composite FM signal;

demodulating signal generating means coupled to the output terminal of said receiving means and responsive to said pilot signal included in said composite FM signal for producing a first demodulating signal having a fundamental frequency of 19 KHz and a phase the same as that of said pilot signal and for producing a second demodulating signal having a fundamental frequency of 19KHz and a phase different by $\pi/2$ radians from that of said pilot signal;

demodulation means coupled to said receiving means and comprising;

a. first multiplying means which receives said frequency discriminated signal and said first demodulating signal and multiplies said frequency discriminated signal and said first demodulating signal for producing a first multiplied signal which has only a d.c. signal and an a.c. signal having a frequency greater than 4KHz;

b. second multiplying means coupled to said first multiplying means and which receives said first multiplied signal and said second demodulating signal and multiplies said first multiplied signal and said second demodulating signal for producing a second multiplied signal; and c. matrixing means coupled to said second multiplying means and which receives said frequency discriminated signal and said second multiplied signal for reproducing as discrete signals said L and R audio signals; and a low pass filter which is coupled to said first multiplying means and selects the d.c. component included in said first multiplied signal for producing a stereo recognition signal.

* * * * *